United States Patent

[11] 3,610,551

[72] Inventor Arthur I. Protas
Cupertino, Calif.

[21] Appl. No. 849,722
[22] Filed Aug. 13, 1969
[45] Patented Oct. 5, 1971
[73] Assignee Cartridge Television Inc.
New York, N.Y.

[54] TAPE CARTRIDGE
3 Claims, 4 Drawing Figs.

[52] U.S. Cl. .......... 242/199
[51] Int. Cl. .......... G03b 1/04, G11b 15/32, G11b 23/04
[50] Field of Search .......... 242/197–200; 179/100.2 Z

[56] References Cited

UNITED STATES PATENTS

| | | | |
|---|---|---|---|
| 2,989,261 | 6/1961 | Gillette et al. | 242/200 X |
| 3,102,699 | 9/1963 | Proctor | 242/200 X |

*Primary Examiner*—Leonard D. Christian
*Attorney*—Townsend and Townsend

ABSTRACT: A tape cartridge having a housing containing a pair of rotatable hubs on which a flexible tape is wound to form a pair of tape packs whose diameter changes as the tape is wound on and wound from the hubs. The hubs are constructed to permit the cartridge to pivot from an inclined position out of coupled relationship to a pair of hub drive shafts into an operative position with the hubs being coupled in driving relationship with respective drive shafts. Improved stop means is provided to hold the tape against movement relative to the housing when the latter is out of its operative position.

PATENTED OCT 5 1971 3,610,551

INVENTOR
ARTHUR I. PROTAS

BY Townsend and Townsend
ATTORNEYS

TAPE CARTRIDGE

This invention relates to improvements in tape cartridges and, more particularly, to a tape cartridge of the type having a pair of tape-receiving hubs.

The cartridge of this invention utilizes a pair of rotatable hubs between a pair of generally parallel walls defining a housing so that a flexible tape wound on the hubs and extending therebetween will form respective tape packs defined by the winding of the tape of the hubs. These tape packs change in diameter as the tape is wound on and unwound from the hubs. The portion of the tape extending between the tape packs passes about a pair of spaced tape guides disposed to position the tape adjacent to and along an open side of the housing. One wall of the housing has, adjacent to the open side, a pair of spaced recesses therein for receiving a second pair of spaced tape guides forming a part of a tape transport or the like so that the tape, under the influence of the second guides, can be moved laterally of and outwardly from the housing and partially about a rotatable drum forming another part of the tape transport when the housing is in an operative position with respect thereto.

Means is preferably provided to maintain the tape packs sufficiently compacted in the tape cartridge at all times. Thus, each tape pack will be uniformly formed as tape is wound thereon and slack in the tape is effectively avoided. Such means may comprise a spring-biased arm for each tape pack which engages the tape pack substantially at the point of entry of the tape thereon for all diameters of the tape pack, the spring on each arm being such that the arm applies a substantially constant bias force to the tape pack for substantially all operative positions of the arm.

An improved stop means is provided in the housing to releasably hold the tape against movement relative to the housing. Such stop means includes a pair of stops for forcing or clamping the tape against the first tape guides mentioned above. Each stop has an elongated rod shiftably received within a passage in an end wall of the housing. Each rod has a lateral extension secured to it and extending outwardly through a slot communicating with the passage so that, when each extension is forced in a predetermined direction, the stop is moved away from the tape and the corresponding tape guide so as to permit the tape to move relative to the housing. Return of the extension to its original position once again causes the corresponding stop to clamp the tape to the guide.

Each hub of the cartridge is provided with a circular bore therethrough which is slightly countersunk at one end thereof. This feature facilitates the movement of the hub onto a hub drive shaft as the cartridge itself moves from an initial position inclined with respect to the hub drive shaft into an operative position with the drive shaft extending into and through the bore. Means is provided on the shaft for coupling the same in driving relationship to the hub. Thus the hub will rotate with the shaft.

The opposite end of the bore is defined by a circular edge on the hub which can be engaged by a substantially spherical bearing member on a cartridge holder. This feature will permit the hub, when it is loosely mounted between the walls of the cartridge housing, to be properly positioned so that it can be readily moved onto its drive shaft as the cartridge pivots into its operative position.

An important object of this invention is to provide an improved tape cartridge of the type having a pair of rotatable hubs permitting a movable magnetic tape to be disposed in the cartridge in the form of tape packs with the hubs being constructed to permit the cartridge to be pivoted from an initial position inclined with respect to a pair of hub drive shafts into an operative position with the hubs coupled to respective drive shafts for rotation thereby.

Another object of this invention is to provide a tape cartridge of the type described wherein each hub has a shaft-receiving bore which is countersunk at one end and has a circular edge at the opposite end so that the hub drive shaft can be readily received in said one end as the cartridge rotates into its operative position and the hub can be properly positioned on a holder having a spherical bearing member engageable with the circular edge at the opposite end of the bore.

A further object of this invention is to provide a tape cartridge of the aforesaid character having improved stop means for clamping the tape against a pair of spaced tape guides in the cartridge with the stop means having structure releasing the clamping action of the stop means when the cartridge is in its operative position to thereby automatically make the tape ready for movement relative to the cartridge when the latter is in such operative position.

Other objects of this invention will become apparent as the following specification progresses, reference being had to the accompanying drawing for an illustration of the invention.

Figures 1, 2, 3, 4:
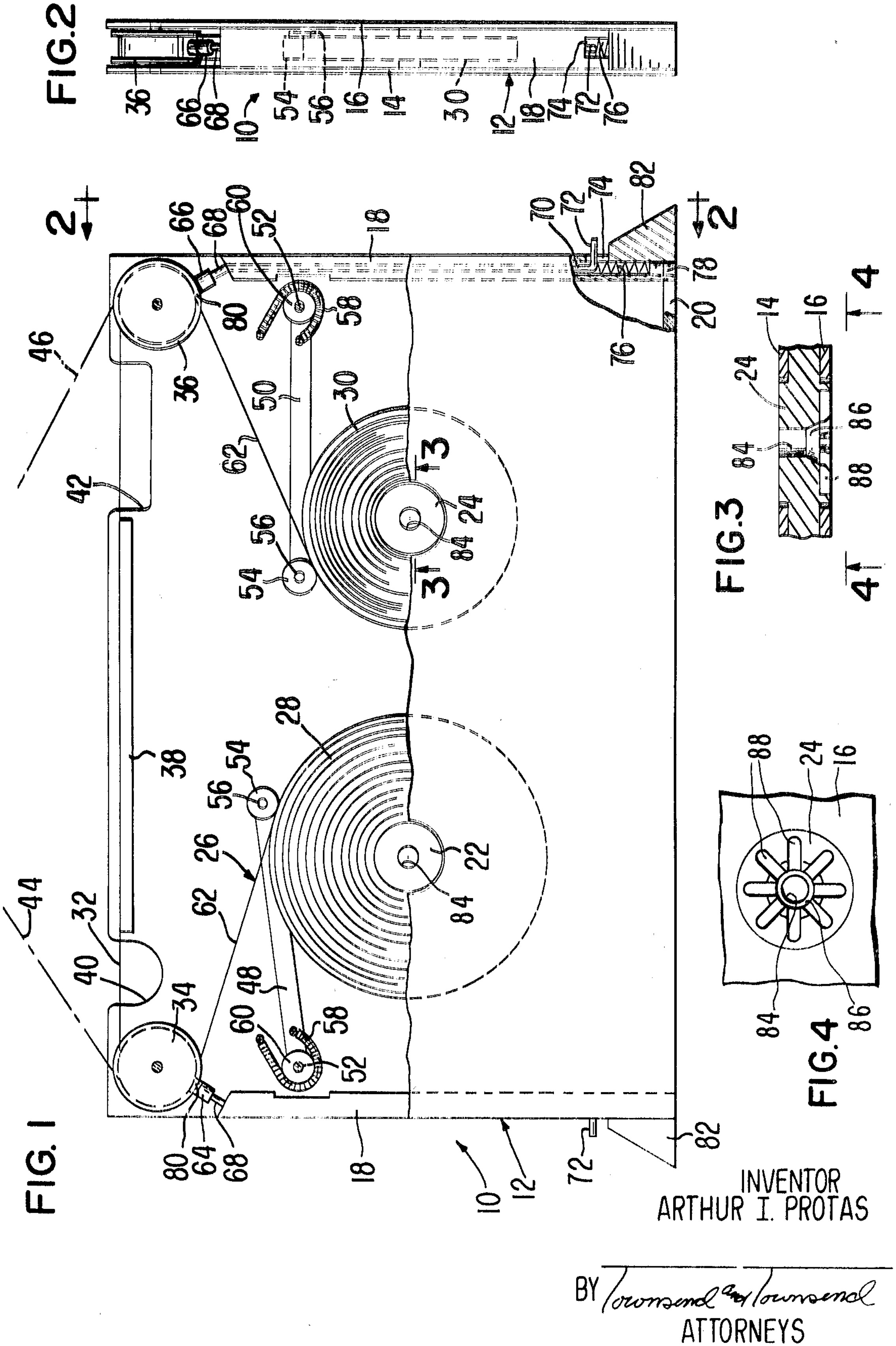
FIG. 1 is an elevational view of a tape cartridge forming the present invention, parts being broken away to illustrate details of construction.
FIG. 2 is an end elevational view of the cartridge looking in the direction of line 2—2 of FIG. 1.
FIG. 3 is a cross-sectional view taken along line 3—3 of FIG. 1.
FIG. 4 is a fragmentary elevational view of the tape cartridge looking in the direction of line 4—4 of FIG. 3.

The cartridge of this invention is broadly denoted by the numeral 10 and includes a housing 12 having a pair of opposed, generally parallel walls 14 and 16 which, for purposes of illustration only; are rectangular in configuration. A pair of end walls 18 span the distance between walls 14 and 16 adjacent to respective end margins of the latter. A sidewall 20 spans the distance between walls 14 and 16 adjacent to respective side margins thereof (FIG. 1). Housing 12 opposite to sidewall 20 is open as shown in FIG. 2 to allow a portion of a flexible tape to be shifted laterally of and outwardly from the housing whereby the tape can be partially wrapped around the outer periphery of a rotatable drum disposed adjacent to the cartridge when the latter is in an operative position on a tape transport of which the drum forms a part.

A pair of generally coplanar hubs 22 and 24 are rotatably mounted within housing 12 and extend between walls 14 and 16. The hubs are adapted to have an elongated, flexible, magnetic tape 26 wound thereon to form respective tape packs 28 and 30 whose diameters increase and decrease as the tape is wound on and unwound from the hubs. One of the tape packs represents the supply of tape and the other tape pack represents a tape takeup means when the cartridge is in use on a tape transport.

Tape 26 has a central portion 32 which extends between tape packs 28 and 30 and is disposed adjacent to and along the open side of housing 12, as shown in FIG. 1, when the cartridge is out of the aforesaid operative position. Portion 32 extends between a pair of tape guides 34 and 36 which are rotatably mounted within housing 12 and disposed between walls 14 and 16. Thus, the tape extending away from tape pack 28 is wrapped partially about tape guide 34, extends longitudinally of the adjacent open side of housing 12, is partially wrapped about tape guide 36, and then merges with tape pack 30. When hub 24 is rotated in a counterclockwise sense, when viewing Fig. 1, the tape moves off tape pack 28, along the open side of housing 12, and then onto tape pack 30. Similarly, during a rewind operation hub 22 is rotated in a clockwise sense so as to cause the tape to move in the opposite direction and onto tape pack 28. A suitable rail or support 38 is provided between walls 14 and 16 longitudinally of the open side margin to support tape portion 32 as it moves between tape guides 34 and 36.

At least one of the walls 14 and 16 has a pair of recesses 40 and 42 therein which permits a second pair of tape guides (not shown) to be received adjacent to the inner surface of tape portion 32 when the cartridge is moved into an operative position on a tape transport of which the second pair of tape guides form a part. The purpose of this construction is to allow the second set of tape guides to be shifted laterally of the open side of housing 12 and away from the latter so as to carry tape portion 32 outwardly of the housing and at least partially about the outer periphery of the aforesaid rotatable drum. In this way, when the drum rotates and the tape shifts circumferentially of the drum, one or more transducers on the drum can scan the tape either for recording or for playback purposes. Dashed lines 44 and 46 represent tape portion 32 when the latter extends laterally and outwardly from housing 12.

To maintain the tape packs compacted substantially at all times, a pair of tape tensioning arms 48 and 50 are provided to engage the tape packs substantially at the entry points of the tape on respective hubs 22 and 24. Each of the arms is swingably mounted adjacent to one end thereof on a shaft 52 carried by housing 12. A tape bearing member 54 is pivotally mounted on a pin 56 on the opposite end of arm 48 and a coil spring 58, secured at one end thereof to arm 48 and the opposite end to housing 12, is partially looped about a disklike bearing element 60 surrounding shaft 52. Spring 58 biases arm 48 toward hub 22 in a manner such that bearing member 54 will engage the tape pack with a substantially uniform bias force.

The length of each arm and the location of its axis of swinging movement are chosen to assure that its tape bearing member 54 engages the tape pack at the entry point of the tape thereon for substantially all diameters of the tape pack itself. This means that each bearing member 54 will be in contact with the straight tape stretch 62 extending between the tape pack and the corresponding tape guide at the point where tape stretch 62 is substantially tangential to the tape pack itself. Thus, the tape will be uniformly wrapped onto the tape pack so as to maintain the latter sufficiently compacted so as to effectively avoid loose tape convolutions which could cause faulty movement of the tape and possible stretching of the tape.

Cartridge 10 is provided with stop means for holding the tape against movement within housing 12 when the cartridge is not in an operative position. Such stop means includes a pair of stop members 64 and 66 for tape guides 34 and 36, respectively. bias stop members are provided to releasably force or clamp the tape against respective guides 34 and 36 to render the tape immovable in the housing. To this end, each of the stop members has an elongated rod 68 coupled thereto, each rod extending through an elongated passage 70 in the adjacent end wall 18. Each rod 68 has a lateral extension 72 adjacent to its opposite end, extension 72 passing through a slot 74 in the corresponding end wall 18 and projecting laterally and outwardly from housing 12. A coil spring 76 in passage 70 engages extension 72 to bias rod 68 and thereby the corresponding stop member toward the adjacent tape guide. A set screw 78 threaded into one end of passage 70 is provided to hold the spring in place as well as to vary its restoring force to thereby vary the clamping force applied by the stop member to the tape. Each stop member has a pad 80 on its outer end to engage the tape. Extension 72 is adjacent to a pair of projections 82 secured in some suitable manner to end walls 18. Projections 82 are provided to facilitate the insertion and removal of cartridge 10 with respect to a cartridge holding device on a tape transport.

Each of the hubs 22 and 24 is constructed to permit cartridge 10 to be moved from an initial position inclined with respect to a pair of hub drive shafts into an operative position with the hub drive shafts received within the central bores extending through respective hubs 22 and 24. By mounting the cartridge initially in an inclined position relative to a tape transport, movement of the cartridge into its operative position is facilitated inasmuch as the pivotal movement from the inclined position to the operative position can be done automatically rather than manually. Thus, proper registry of the tape with respect to transducer means can be assured, notwithstanding the fact that the tape is to be moved out of cartridge 10 for recording and playback purposes.

Each hub has a circular edge 84 (Figs. 1 and 3) defining one end of the corresponding bore and which is adapted to be engaged by a spherical bearing member (not shown) on a holder (not shown) provided for mounting cartridge 10 on a tape transport. Also, each hub is loosely mounted between walls 14 and 16 so that the hub can shift transversely of its bore. This is shown in Fig. 3 wherein hub 24 is slightly spaced inwardly from the corresponding circular inner peripheries of walls 14 and 16. By this loose mounting, the hub can be properly positioned by the spherical bearing member engaging the corresponding circular edge 84 so as to properly position the hub notwithstanding manufacturing or assembly errors. The outer surface of the spherical bearing member will engage the circular end edge 84 so as to center the hub sufficiently to permit it to move into coupled relationship with the corresponding drive shaft as the cartridge, carried by the holder, is pivoted into its operative position upon pivoting movement of the holder itself.

To further facilitate the placement of each hub on its corresponding drive shaft, the hub is slightly countersunk at the end of the bore opposite to circular end edge 84. This countersunk region, denoted by the numeral 86, is shown in Fig. 3 and is sufficiently tapered to permit the hub to move onto a hub drive shaft notwithstanding the misalignment of the hub bore relative to the drive shaft when the cartridge is inclined with respect to the shaft. Also, one end face of each hub is provided with radial grooves 88 (Fig. 4) so that a pin rotatable with and spaced radially from the corresponding drive shaft can be received within any one of the grooves to thereby place the shaft in driving relationship to the hub.

In use, cartridge 10 is inserted into a cartridge holder (not shown) of the type having a pair of spaced, spherical bearing members. The holder will form a part of a tape transport mechanism (not shown) and will initially be in an inclined position with respect to a pair of spaced hub drive shafts also forming parts of the mechanism. Each shaft will have a pin for insertion into a groove 88 of the corresponding hub. Since the holder will initially be in an inclined position, the cartridge will also be inclined but the spherical bearing members on the holder will properly position the central bores of the hubs for receiving the hub drive shafts as the cartridge is pivoted by the holder into its operative position.

As the cartridge is so pivoted, the countersunk regions 86 of the hubs effectively guide the hub drive shafts into the hub bores. Also, the cartridge moves into a location in which a pair of spaced tape guides, mounted on a shiftable arm forming another part of the tape transport mechanism, are received within recesses 40 and 42. Also, as the cartridge moves into its operative position, extension 72 is engaged by pins or other structure carried by the tape transport so that the extensions are shifted toward projections 82 against the bias forces of the corresponding coil spring 76. This action moves stop members 64 and 66 away from tape guides 34 and 36 to thereby allow the tape to move with respect to the housing. Also, hubs 22 and 24 will move into coupled relationship with hub drives on the tape transport as the cartridge moves into its operative position.

The tape guides carried by the tape transport are then shifted laterally and outwardly of the open side of housing 12 to thereby carry tape portion 32 therewith into at least partially surrounding relationship to a rotatable drum on the tape transport, the drum having spaced transducers thereon.

For a recording or playback operation, the hub drive corresponding to hub 24 is actuated to rotate the latter in a counterclockwise sense, so that tape is moved off tape pack 28 and onto tape pack 30. During this time, tape bearing members 54 apply a constant bias force to the tape packs at substantially the location at which the longitudinal stretches 62 enter and leave the tape pack. In this way, the tape is removed uniformly from one tape pack and onto the other tape pack.

For a rewind operation, the hub drive corresponding to hub 22 will be placed in operation, the hub drive of hub 24 being inoperative. During this time, the tape moves in the opposite direction and the diameter of tape pack 28 increases while that of tape pack 30 decreases.

To remove the cartridge from its operative position, the holder is pivoted in the opposite direction to thereby move the hubs of the cartridge away from their drive shafts. The cartridge can then be removed from the holder. When this occurs, extensions 72 are moved out of engagement with the pins on the tape transport so that coil springs 76 once again force stop members 64 and 66 into clamping relationship to the tape against respective tape guides 34 and 36.

What is claimed is:

1. A tape cartridge comprising: a housing having a pair of spaced hubs rotatably mounted therewithin and disposed to permit a flexible tape to be wound thereon and to extend therebetween with the tape wound on each hub forming a tape pack whose diameter changes as the tape is wound on and unwound from the hub; a pair of spaced tape guides within said housing for positioning the tape portion extending between the hubs adjacent to and along one side margin of the housing, each hub having a bore provided with an open end, the bore being enlarged at said open end to facilitate insertion of a shaft thereinto as the housing pivots relative to the shaft; a releasable stop member for each tape guide, respectively, a rod secured to each stop member, respectively, and extending along a corresponding end margin of said housing; a spring biasing each rod in one direction to urge the corresponding stop member into engagement with said tape portion to prevent movement thereof relative to said housing; and a lateral extension secured to each rod and projecting laterally therefrom and outwardly of said housing, each stop member movable out of engagement with said tape portion as the corresponding extension is moved in a direction opposite to said one direction in response to the movement of said housing into an operative position on a tape transport.

2. A tape cartridge comprising: a housing having a pair of spaced opposed walls; a pair of spaced, substantially coplanar hubs rotatably mounted between said walls and adapted to permit a flexible tape to be wound thereon and to extend therebetween, each hub having a bore therethrough, there being a circular edge on each hub defining one end of the bore thereof, the opposite end of the bore of each hub being tapered with the smaller diameter end of the taper being inwardly spaced from the opposite end of the bore, the tape wound on each hub forming a tape pack whose diameter changes as the tape is wound on and unwound from the hub, said housing having an open side adjacent to a respective side margin of each wall; a pair of spaced tape guides carried within said housing adjacent to the ends of said open side, said tape guides being disposed to position the tape portion extending between said hubs along said open side, at least one of said walls having a pair of spaced recesses therein communicating with said open side, whereby said tape portion can be moved laterally of and outwardly from said housing by tape guide structures received within said recesses and movable laterally of said open side, the tape having a segment extending between each tape pack and a corresponding tape guide when the tape is wound on said hubs; means within the housing for maintaining the tape packs substantially in a compacted form for substantially all diameters of the tape packs; and shiftable stop means carried by said housing adjacent to the end margins of said walls for releasably clamping said tape portion against respective tape guides to thereby prevent movement of said tape portion relative to said housing until said stop means is shifted sufficiently to permit the tape portion to be out of clamped relationship with the tape guides.

3. A tape cartridge comprising: a housing having a pair of spaced opposed walls; a pair of spaced, substantially coplanar hubs rotatably mounted between said walls and adapted to permit a flexible tape to be wound thereon and to extend therebetween, the tape wound on each hub forming a tape pack whose diameter changes as the tape is wound on and unwound from the hub, said housing having an open side adjacent to a respective side margin of each wall, said housing having a pair of spaced end wall members spanning the distance between said walls adjacent to respectively opposed end margins thereof, each end wall member having a longitudinal passage therethrough and a lateral slot communicating with said passage; a pair of spaced tape guides carried within said housing adjacent to the ends of said open side, said tape guides being disposed to position the tape portion extending between said hubs along said open side, at least one of said walls having a pair of spaced recesses therein communicating with said open side, whereby said tape portion can be moved laterally of and outwardly from said housing by tape guide structures received within said recesses and movable laterally of said open side, the tape having a segment extending between each tape pack and a corresponding tape guide when the tape is wound on said hubs; means within the housing for maintaining the tape packs substantially in a compacted form for substantially all diameters of the tape packs; shiftable stop means carried by said housing adjacent to the end margins of said walls for releasably clamping said tape portion against respective tape guides to thereby prevent movement of said tape portion relative to said housing until said stop means is shifted sufficiently to permit the tape portion to be out of clamped relationship with the tape guides, said stop means including a rod shiftably received within each passage, respectively, each rod having a lateral extension projecting through the corresponding slot; and means biasing each rod in one direction within the corresponding passage.